United States Patent
Eves et al.

(10) Patent No.: US 11,668,222 B2
(45) Date of Patent: Jun. 6, 2023

(54) CATALYTIC COMPOSITE

(71) Applicant: W. L. Gore & Associates, Inc., Newark, DE (US)

(72) Inventors: Robert Eves, Newark, DE (US); Tarun Poddar, Newark, DE (US); John A. Tomanovich, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 17/366,499

(22) Filed: Jul. 2, 2021

(65) Prior Publication Data

US 2021/0332732 A1    Oct. 28, 2021

Related U.S. Application Data

(63) Continuation of application No. 16/869,296, filed on May 7, 2020, now Pat. No. 11,078,821, which is a continuation of application No. PCT/US2017/062272, filed on Nov. 17, 2017.

(51) Int. Cl.
*F01N 3/10* (2006.01)
*F01N 3/28* (2006.01)
*B01J 31/06* (2006.01)

(52) U.S. Cl.
CPC ............ *F01N 3/2839* (2013.01); *B01J 31/06* (2013.01); *F01N 3/105* (2013.01); *F01N 3/2835* (2013.01); *F01N 3/2892* (2013.01)

(58) Field of Classification Search
CPC .... F01N 3/2839; F01N 3/2835; F01N 3/2892; B01J 31/06
USPC .................................. 422/177; 502/242, 309
See application file for complete search history.

(56) References Cited

U.S. PATENT DOCUMENTS

| | | | | |
|---|---|---|---|---|
| 5,677,031 A | * | 10/1997 | Allan | B01D 39/1661 428/323 |
| 5,843,390 A | * | 12/1998 | Plinke | B01D 39/083 422/177 |
| 58,433,990 | | 12/1998 | Plinke | |

FOREIGN PATENT DOCUMENTS

| | | |
|---|---|---|
| EP | 0 854 751 A1 | 7/1998 |
| JP | H04 235718 A | 8/1992 |
| JP | 4543762 B2 | 9/2010 |
| WO | 2016/131697 A1 | 8/2016 |

OTHER PUBLICATIONS

International Search Report and Written Opinion from International Application No. PCT/US2017/062272 dated Jun. 29, 2018.

* cited by examiner

*Primary Examiner* — Tom P Duong

(57) ABSTRACT

A catalytic composite is formed of a catalytic layered assembly including a porous catalytic fluoropolymer film and one or more felt batts connected with the porous catalytic fluoropolymer film. At least one felt batt is positioned adjacent the upstream side of the porous catalytic fluoropolymer film to form the catalytic composite. The fluoropolymer film is perforated to allow for enhanced airflow therethrough while retaining the capability of catalyzing the reduction or removal of chemical species in fluid flowing through the catalytic composite.

16 Claims, 5 Drawing Sheets

CATALYTIC COMPOSITE

CROSS-REFERENCE TO RELATED APPLICATIONS

This application is a continuation of U.S. patent application Ser. No. 16/869,296 filed May 7, 2020, which is a continuation of International Patent Application No. PCT/US2017/062272 filed Nov. 17, 2017. The disclosures of which are incorporated herein in their entirety.

TECHNICAL FIELD

The present disclosure relates to a catalytic composite for used in filtration materials which can remove contaminants, including target species, from a fluid stream. In particular a catalyst composite comprising a catalyst fluoropolymer film.

BACKGROUND

Catalytic filters are employed for a variety of fluid filtering applications. Typically, these filters combine a catalytic material (e.g., $TiO_2$, $V_2O_5$, $WO_3$, $Al_2O_3$, $MnO_2$, zeolites, and/or transition metal compounds and their oxides) within a matrix. As the fluid passes over or through the matrix, contaminants within the fluid react with catalyst particles to convert the contaminants to a more desirable by- or end-product, and therefore remove select species of contaminants from the fluid stream. The specific contaminants targeted by a catalyst may also be referred to as target species. Various target contaminants are byproducts of combustion or industrial process, e.g., transportation combustion, coal combustion, municipal waste incineration, and oil refining. Examples of such target contaminants and catalysts include:

TABLE 1

Example Catalysts

| Target species | Active Material | Resulting Product (s) |
|---|---|---|
| $NO_x$, $NH_3$ | $TiO_2$, $V_2O_3$, $WO_3$ | $N_2 + H_2O$ |
| CO | $Al_2O_3$, Pt | $CO_2$ |
| Dioxin/Furan | $TiO_2$, $V_2O_3$, $WO_3$ | $CO_2$, HCl, $H_2O$ |
| $O_3$ | $MnO_2$ | $O_2$ |

Examples of previous attempts to produce a catalytic filter device include those set forth in U.S. Pat. Nos. 4,220,633 and 4,309,386 where filter bags are coated with a suitable catalyst to facilitate the catalytic reduction process of NON. In U.S. Pat. No. 5,051,391, a catalyst filter is disclosed which is characterized in that catalyst particles which are made of metal oxides with a diameter of between 0.01 to 1 µm are carried by a filter and/or a catalyst fiber. In U.S. Pat. No. 4,732,879 a method is described in which porous, preferably catalytically active, metal oxide coatings are applied to relatively non-porous substrates in a fibrous form. In DE 3,633,214 A1, a catalyst powder is incorporated into multilayered filter bags by inserting the catalyst into the layers of the filter material.

Further examples to produce catalytic filter devices include those set forth in JP H08-196830, to Fujita et al., in which a micropowder of an adsorbent, reactant, or the like is supported in a filter layer interior. In JP H09-155123, a denitrification layer is formed on a filter cloth. In JP H09-220466, a catalyst filter is made by impregnating a cloth of glass fibers with titanium oxide sol which is then heat treated and further impregnated with ammonium metavanadate. In JP H04-219124, a compact, thick, and highly breathable filter cloth is filled with catalyst for the bag filter material in order to prevent catalyst separation. In U.S. Pat. No. 5,620,669, the filter comprises composite fibers of expanded polytetrafluoroethylene (ePTFE) having a node and fibril structure, wherein catalyst particles are tethered within the structure. U.S. Pat. No. 6,331,351, discloses chemically active particles attached to a porous substrate by means of a polymer adhesive. A microporous layer is attached to at least one side of, or within, the porous substrate. The resulting filter material removes contaminants such as dust, from the filter stream before the dust can clog active catalytic sites, as well as remove undesirable species by means of catalysis or reaction.

During filter operation, two main problems typically can occur with the conventional constructions, namely chemical deterioration and mechanical deterioration. With chemical deterioration, the chemical function of the filter can be rendered useless due to contamination, which is a serious problem with virtually every conventional active filter device, and especially for catalytic filter devices. Although, by definition, catalysts are not consumed during the catalytic reaction, catalytic filters may have limited operating lives due to particle, liquid, and gaseous contamination from a fluid stream (i.e., fine dust particles, metals, silica, salts, metal oxides, hydrocarbons, water, acid gases, phosphorous, alkaline metals, arsenic, alkali oxides, etc.). Deactivation occurs because the active sites on the active particles within the filter are physically masked or chemically altered. Unless these contaminants can be shed from the filter, the filter will rapidly diminish in efficiency until it must be replaced. Additionally, in some instances, the processing aids used in manufacture can cause deterioration of the catalysts. A variety of cleaning apparatus exist to remove dust from filters (e.g., shaker filter bags, back-pulse filter bags and cartridges, reverse air filter bags, etc.), but these devices are not particularly effective at removing dust embedded inside the filter material.

Another form of chemical deterioration is due to the loss of inserted catalysts during operation. The catalyst particles in many instances are not attached strongly enough to the host fibers to withstand the rigors of normal operation. As a result, the catalyst particles fall out of the filter, thereby not only diminishing filter effectiveness, but also contaminating the clean fluid stream.

With respect to mechanical deterioration, the mechanical function of the filter can deteriorate by abrasion of the filter fibers during operation or by the penetration and collection of dust contaminates in the filter. Another mechanical failure is due to dust particle break-through. Additionally, high temperature (e.g., at least 160° C.) operation and reactive chemical species in typical filtration systems and bag houses can cause deterioration of the filter media over several years or, in some cases, several months.

JP H10-230119 is directed to a filter material formed by immersing fibers to be formed into a filter cloth in a liquid catalyst, drying the catalyst, molding the fibers into a filter cloth and applying an ethylene tetrafluoride resin continuous porous thin film to the filter cloth.

U.S. Pat. No. 5,843,390 describes a catalytic filter for removing contaminants such as NOx from a fluid stream. This filter employs composite fibers containing catalytic particles that are chipped into staple fibers and made into a catalytic felt material. This filter can remove macro particles, such as dust, before the dust can clog active filter sites, and effectively convert undesirable contaminants catalytically. However, this filter has a costly manufacturing process, and improved performance is still needed.

As noted above, various catalytic materials for filtering contaminants from a fluid stream have been disclosed; however, such materials are subject to many forms of failure, deterioration, or clogging. Thus, there is a continuing need for catalytic filter materials that can effectively remediate contamination while remaining durable and providing sufficient flow rate to be useful as filters.

SUMMARY

In one embodiment, the present disclosure relates to a catalytic composite. The catalytic composite includes a catalytic layered assembly that includes a porous catalytic fluoropolymer film having a first, upstream side and a second, downstream side; and one or more felt batts. A first felt batt is positioned adjacent the upstream side of the porous catalytic fluoropolymer film to form the catalytic composite, and the fluoropolymer film is perforated to enhance air permeability of the fluoropolymer film without degrading the suitability of the catalytic composite for catalyzing the reduction or removal of chemical contaminants in a fluid flowing therethrough. Each felt batt can be formed of fleece formed from PTFE staple fiber. The composite can be connected together by a plurality of perforations formed by a needle punching process, by a needling process, or both. The porous catalytic fluoropolymer film can be perforated by punching at a diameter corresponding to a punch diameter from 0.3 to 6.5 mm; or by needling at a diameter corresponding to a needle diameter from 0.1 to 3.0 mm. Each felt batt can be formed of a fluoropolymer such as, but not limited to, a PTFE felt, a PTFE fleece, an ePTFE felt or fleece, or a fluoropolymer staple fiber woven or nonwoven. The catalytic composite may also include multiple porous catalytic fluoropolymer films.

The composite can include additional layers, such as a scrim positioned on the downstream side of the porous catalytic fluoropolymer film, a second felt batt positioned downstream of the porous catalytic fluoropolymer layer and/or downstream of the scrim, and a porous protective layer disposed on an upstream side of the first felt batt for blocking particulate ingress. The porous protective layer can be an expanded polytetrafluoroethylene (ePTFE) membrane or other suitable porous expanded ePTFE layer.

The catalytic composite can, according to some embodiments, include perforations in the porous catalytic fluoropolymer film alone; or in some cases, multiple layers may be perforated together. For example, in one embodiment, the fluoropolymer film, felt batt, and other layers may be connected together by way of the needling and/or needle punching operations that perforate the fluoropolymer film. The fluoropolymer film can have a perforation pattern resulting in an open area of the fluoropolymer film from 0.14% to 50%. A resulting permeability of the catalytic composite can result in a flow rate in the range of 0.9 to 21.3 m/min at 124.5 Pa.

In one embodiment, the present disclosure relates to a catalytic composite formed of a perforated porous membrane that is filled with a catalytic material and perforated.

In one embodiment, the present disclosure relates to a method of forming a catalytic composite as described above. The catalytic composite can be formed by forming a catalytic layered assembly, by layering a porous catalytic fluoropolymer film with a first felt batt on a first side of the porous catalytic fluoropolymer film. The layered assembly can be connected together to form a multilayered composite, and the fluoropolymer film can be perforated such that the multilayered composite has a minimum air permeability of at least 0.9 m/min at 124.5 Pa.

The method can include steps of adding layers prior to the connecting step, e.g., adding a scrim to the catalytic layered assembly on a second side of the porous catalytic fluoropolymer film opposite the first side, adding a second felt batt to the layered assembly adjacent the scrim and opposite the porous catalytic fluoropolymer film; and/or adding a porous protective membrane to the layered assembly adjacent the first felt batt and opposite the porous catalytic fluoropolymer film.

Connecting the layered assembly together to form the multilayered composite can include connecting the catalytic layered assembly together via the perforation step, via an adhesive, via a heat treatment step, or any suitable combination of these steps. For example, in at least one embodiment, the catalytic layered assembly is set via a heat treatment step that includes heat treating the multilayered composite at a temperature in the range of 290° C. to 330° C. for at least 1 minute, or until the assembly has reached thermal stability.

Perforating the fluoropolymer film can include a needle punching process, a needling process, or a combination of the two. For example, a perforation pattern can be needled into the fluoropolymer film to an open area of at least 0.2%. Alternatively, the perforation pattern may be needle punched into the multilayered composite to an open area of at least 0.2%. Further, the needling or needle punching steps may be performed on the layered assembly, including other assembled layers, resulting in perforations of the fluoropolymer film along with minor deformation/perforation of the adjacent layers, which may connect the layers.

In one embodiment, the present disclosure relates to a catalytic article that includes a perforated porous polymeric membrane containing therein a catalytic material. The perforated porous polymeric membrane contains a plurality of pores; and the catalytic material at least partially fills the pores of the porous membrane. In some specific embodiments, the porous membrane has a microstructure including, or in some cases substantially made up of, fibrils. The catalytic material can be enmeshed in the fibrils of the microstructure. In various embodiments, the catalytic material extends from into the pores of the porous membrane.

In one embodiment, the present disclosure relates to a method of using a catalytic filter that includes a catalytic composite as described above. For example, in one embodiment a catalytic filter is provided that includes a catalytic composite as described above. The catalytic filter is placed in a fluid stream and oriented with the scrim upstream of the fluoropolymer film with respect to a flow direction of the fluid stream, and the fluid stream is passed through the catalytic filter to remove chemical and/or particulate contaminants therefrom.

These and other embodiments, along with many of their advantages and features, are described in more detail in conjunction with the below description and attached figures.

BRIEF DESCRIPTIONS OF THE DRAWINGS

The accompanying drawings are included to provide a further understanding of the disclosure and are incorporated in and constitute a part of this specification, illustrate embodiments, and together with the description serve to explain the principles of the disclosure.

While the following is amenable to various modifications and alternative forms, specific embodiments have been shown by way of non-limiting examples in the drawings and are described in detail below. The description covers all modifications, equivalents, and alternatives thereof.

DETAILED DESCRIPTION

Persons skilled in the art will readily appreciate that various aspects of the present disclosure can be realized by any number of methods and apparatus configured to perform the intended functions. It should also be noted that the accompanying figures referred to herein are not necessarily drawn to scale, but may be exaggerated to illustrate various aspects of the present disclosure, and in that regard, the drawing figures should not be construed as limiting.

The term "filter," as used herein, is intended to encompass any device that blocks, traps and/or modifies particles or molecules passing through the device. The use of the term "fluid" in the present application is intended to encompass any form of readily flowing material, including liquids and gases. The term "catalytic" is intended to mean that the filter is capable of catalyzing one or more contaminants in a fluid stream to accelerate a reaction that alters (i.e., reduces or oxidizes) the contaminants into non-polluting or less-polluting substances. The term "high temperature fiber" as used herein is intended to encompass any fiber which can withstand continuous exposure to temperatures of at least 150° C., or in some cases at least 160° C., without significant thermal degradation.

The present disclosure is directed to a catalytic composite for use in removing target species found in a fluid stream. The composite includes high temperature staple fibers in the form of one or more felt batts, with at least one felt batt positioned upstream of a perforated, porous catalytic fluoropolymer film. As used herein, the term "perforated" refers to perforations (i.e., holes) spaced throughout some or all of the film or membrane and having a minimum perforation density (i.e., holes per cm$^2$). In one embodiment, the composite includes a scrim positioned downstream that is directly adjacent the perforated catalytic fluoropolymer film and that acts as a support layer for the assembly. The scrim may be a woven or a non-woven scrim, a metallic scrim, or any other suitable supportive scrim. The perforated catalytic fluoropolymer film may be, microporous or porous (excluding the perforations), but in any event, contains catalytic material that is able to catalyze the remediation of contaminants in fluid that passes over and through the film, i.e., the conversion of target species to nonpolluting or less-polluting compounds by a catalyzed reaction. The protective membrane is generally non-catalytic. With this composite, contaminants such as dioxins, furans, NOx, CO, and the like, can be effectively removed from a fluid stream. Optionally, at least one porous or microporous protective membrane is positioned adjacent to or within the assembly and upstream of the perforated catalytic fluoropolymer film and is able to remove particulates from the fluid stream so that the particulates do not clog perforations or pores of the film, or otherwise block catalytic sites of the film.

Figure 1:
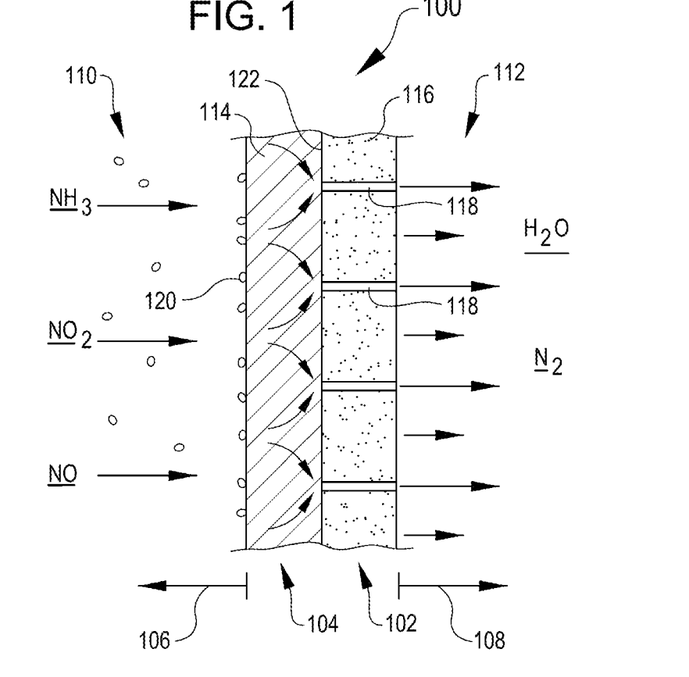
FIG. 1 is a schematic illustration of a composite filter material that includes a perforated, porous catalytic fluoropolymer film assembled with an upstream felt batt, in accordance with one embodiment of the present disclosure.

Turning to FIG. 1, a first example of a catalytic composite 100 is shown, including a porous catalytic fluoropolymer film 102 and a felt batt 104. An upstream direction 106 is defined in terms of the prevailing direction of incoming fluid flow 110, and a downstream direction 108 is defined in terms of a prevailing direction of outgoing fluid flow 112. The felt batt 104 is positioned upstream of the porous catalytic film 102, and is operable to collect debris 120 (e.g., dust and the like) from the incoming fluid flow 110. The porous catalytic fluoropolymer film 102 is a catalytic material containing a suitable embedded catalyst in a substrate fluoropolymer film. Suitable catalysts and substrates are described in U.S. Pat. No. 5,843,390, which is hereby incorporated by reference for all purposes. For example, U.S. Pat. No. 5,843,390 describes a fibrous catalytic polytetrafluoroethylene (PTFE) filter formed by forming an active catalyst with low particle sizes, combining the catalyst with a fluoropolymer resin, and then forming a felt using the catalytic material. Suitable catalysts include, but are not limited to: $TiO_2$, $V_2O_3$, and $WO_3$, which target NOx species and $NH_3$; $Al_2O_3$ and Pt, which target CO; $TiO_2$, $V_2O_3$, $WO_3$, which target Dioxin and Furan; and/or $MnO_2$, which targets $O_3$. In a fibrous filter as disclosed in U.S. Pat. No. 5,843,390, a structure containing the catalyst is into fine catalytic fibers, and the filter is formed from the fine catalytic fibers optionally mixed with other fibers. In contrast, embodiments as described herein are directed to an intact, porous catalytic fluoropolymer film with perforations. This perforated catalytic fluoropolymer film is perforated to permit fluid to pass readily through the fluoropolymer film while still interacting sufficiently with the catalytic material of the film to remediate contamination in the fluid stream. The use of a perforated film provides significant advantages in manufacturing, as steps associated with forming and recombining fibers into a highly porous catalytic felt (as previously disclosed) can be omitted. Surprisingly, the fluoropolymer film 102, due to the perforations, allows sufficient airflow even at low pressure differences to avoid significantly impeding functionality as a filter, while providing sufficient contact between the catalytic material of the film and the incoming fluid flow 110 to adequately catalyze the remediation of contaminants in the fluid flow. The catalytic material of the catalytic fluoropolymer film can be selected to target specific contaminant species. For example, the catalytic material of the fluoropolymer film 102 can include some combination of, or all of, the catalytic species $TiO_2$, $V_2O_3$, $WO_3$ suitable for catalyzing the reduction or removal of NOx species such as NO, $NO_2$, $NO_3$ to water and nitrogen gas, as illustrated. However, other catalytic materials may be substituted or included that are suitable for conversion of different contaminants, e.g., for remediating CO, Dioxin/Furan, $O_3$, and other contaminants. The fluoropolymer film 102 can include any suitable fluoropolymer, including PTFE, or a more porous expanded polytetrafluoroethylene (ePTFE).

In one embodiment, the porous catalytic fluoropolymer film 102 is perforated, including intact portions 116 and perforations 118. The perforations 118 can be formed in the film 102 by way of a needling operation and can vary in size depending on the needling operation. Suitable needling operation may include a needle being pressed through the film while puncturing and displacing material, or a needle punching operation in which the needle removes a portion of film. In one embodiment, the fluoropolymer film 102 is needled and the perforations correspond to a needle diameter from 0.1 to 3.0 mm. In another embodiment, the fluoropolymer film 102 is needle punched, with perforations corresponding to a needle diameter from 0.1 to 3.0 mm. In either case the perforations 118 are spaced throughout the fluoropolymer film 102 with a perforation density on the order of 185 to 558 holes per $cm^2$, or from 1 to 64 holes per $cm^2$. Alternatively, the permeability of the perforated fluoropolymer film 102 may be described in terms of the percent open area of the fluoropolymer film, which can be from 1 to 50%. The perforations, in conjunction with the porosity of the fluoropolymer film, provide the catalytic composite 100 as a whole with an air permeability suitable for use in filtration. For example, the catalytic composite 100 can accommodate a high flow rate per unit area, which may be described in terms of the Frazier number. In one embodiment, the catalytic composite 100 has a Frazier number of 2 or higher, corresponding to a flow rate of 2 CFM at 0.5 in $H_2O$, or 0.61 m/min at 124.5 Pa under the Frazier Air Permeability Test.

In various embodiments of the present disclosure, the perforations 118 are formed in a pattern in the porous catalytic fluoropolymer film 102. The pattern provides a perforation density of at least one hole per $cm^2$ and an open area of at least 0.2%. Thus, larger perforations can correspond to larger spacing between adjacent perforations, and smaller perforations can correspond to closer spacing between adjacent perforations. In some specific examples, the perforation density can range from 185 to 558 holes per $cm^2$. The pattern is preferably organized so that airflow through the perforations is regular across the film 102. Some suitable patterns can include square patterns, triangular closely-spaced patterns, amorphous patterns, or any other comparable pattern that generally complies with the minimum perforation density.

The porous catalytic fluoropolymer film 102 promotes catalyzed reduction or removal of target species via an integrated catalytic material in the fluoropolymer film. However, structure of the fluoropolymer film 102 differs significantly from existing catalytic structures. For example, the bulk of the fluoropolymer film 102 (i.e., the intact portion 116) is not believed to allow sufficient airflow to function as a component of a catalytic filter material absent the perforations 118. The perforations 118 reduce the pressure drop (i.e., increase the air permeability) across the fluoropolymer film 102, rendering it usable in a variety of applications. The perforated fluoropolymer film 102 can have an air permeability of 1.5 to 61 m/min, or in some cases from 1.5 to 61 m/min, under a pressure of 124.5 Pa. Surprisingly, the passage of fluid through the perforations 118 does not destroy the utility of the fluoropolymer film 102 as a catalyzing structure, even though a substantial part of the fluid flows through the perforations rather than the unperforated intact portions 116. According to at least one embodiment, the perforations extend fully through the film, and provide conduits for the passage of a substantial part of the fluid therethrough. Nonetheless, sufficient fluid contacts the porous, catalytic fluoropolymer film and interacts with the catalytic materials therein to effectively remediate contaminants in the fluid flow. It is believed that the assembled combination of the fluoropolymer film 102 and felt batt 104 is at least partly responsible for the efficacy of the composite as a catalyzing filter. For example, the fluoropolymer film 102 and felt batt 104 interact, with the interior structure 114 (e.g., staple fibers) of the felt batt 104 allowing the incoming fluid flow 110 to circulate within the felt batt 104 and especially along the interface 122 of the felt batt and the fluoropolymer film 102. This circulation brings the incoming fluid flow 110 in sufficient contact with the porous catalytic fluoropolymer film 102 to catalyze the incoming fluid flow and reduce or remove chemical contaminants.

The felt batt 104 can include any suitable, porous structure capable of filtering particulate contaminants 120 and/or moderating the incoming fluid flow 110 for introduction to the fluoropolymer film 102. The felt batt 104 can be composed of any suitable woven or nonwoven having a highly porous interior structure, such as but not limited to a staple fiber woven or nonwoven, a PTFE staple fiber woven or nonwoven, a fleece formed from a fluoropolymer staple fiber, or a fluoropolymer staple fiber woven or nonwoven. In one embodiment, the felt batt 104 is a PTFE fiber felt, or a PTFE fiber fleece.

In one embodiment, the component layers of the catalytic composite 100 are connected together by way of the needling or needle punching operation, i.e., a needle or punch can be pressed through both of the assembled felt batt 104 and fluoropolymer film 102 in order to locally deform the layers to hold the layers in contact. In general, a needling operation penetrates and deforms the material, while a needle punching operation also removes a small plug of material; but both operations may be referred to as "needling". Layers in the catalytic composite 100 may also be held together by lamination or applied heat treatment, by adhesives (typically discontinuous adhesives), by external connectors, by weaving or other comparable connective means, or by any suitable combination of the above. In one embodiment, the component layers of the catalytic composite 100 are combined by needling and/or needle punching, followed by a subsequent heat treatment to set the composite. Alternatively, the component layers of the catalytic composite 100 can be combined by pressing the layers together after the perforations have already been applied to the fluoropolymer film 102, and subsequently heat treating the layered assembly to form the catalytic composite.

In one embodiment, a catalytic article can be formed of a perforated porous polymeric membrane (e.g., a fluoropolymer film like film 102 including perforations 118) and a catalytic material imbibed, enmeshed, embedded or otherwise contained in the membrane. In some specific embodiments, the porous membrane has a fibrillated microstructure, i.e. a microstructure that includes or is substantially made up of, fibrils. Fibrillated microstructures may include nodes and fibrils or may be substantially composed of fibrils without nodes. In such embodiments, the catalytic material, e.g. catalytic particles or the like, can be enmeshed in the fibrils of the microstructure. In various embodiments, the catalytic material can extend from into the pores of the porous membrane; and in some embodiments may extend into the perforations. In various embodiments, the catalytic article can be assembled with, or without, a supportive layer or felt layer as described above. In other words, a catalytic article can be produced that contains a perforated porous polymeric membrane with a catalytic material contained therein without a support or felt layer.

Figure 2:
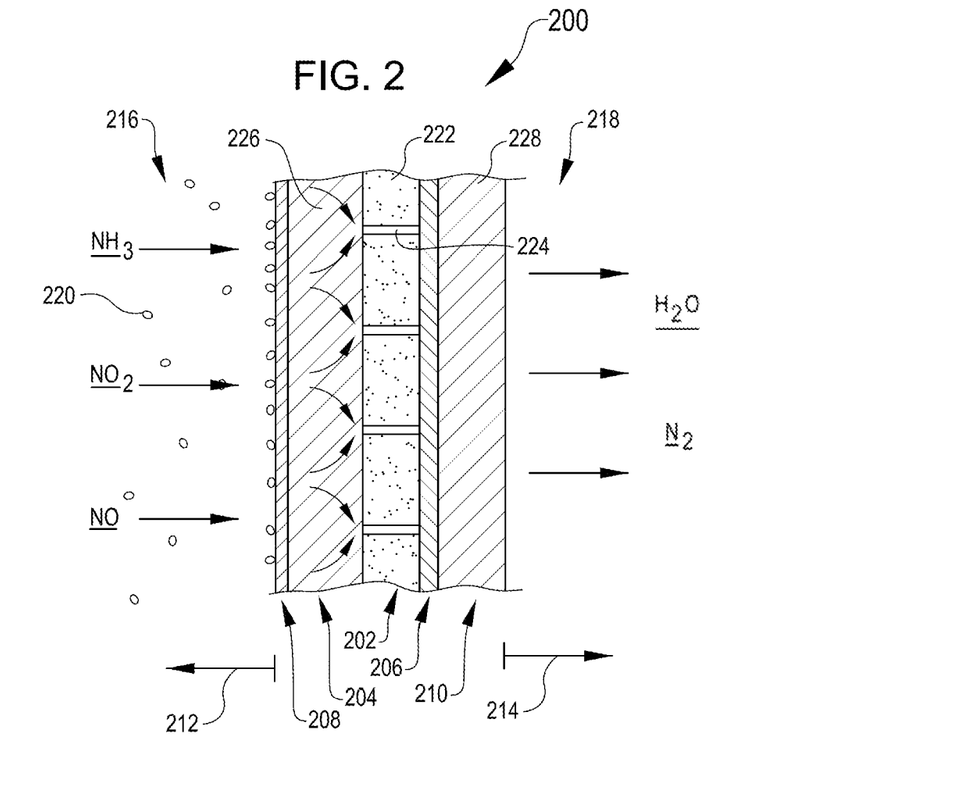
FIG. 2 is a schematic illustration of a second composite filter material that includes a perforated, porous catalytic fluoropolymer film assembled with a scrim, with upstream and downstream felt batts, and a protective porous membrane.

The layers (e.g. fluoropolymer film 102, felt batt 104) of the catalytic composite 100 can also be combined with additional layers. For example, FIG. 2 illustrates an example of a catalytic composite 200 including additional layers. The catalytic composite 200 and components thereof can be described in terms of an upstream side 212 facing an incoming fluid flow 216, and a downstream side 214 from which an outgoing fluid flow 218 originates. FIG. 2 shows a porous catalytic fluoropolymer film 202, similar to fluoropolymer film 102 (FIG. 1), layered with a first felt batt 204 and a protective porous membrane 208 in an upstream direction 212 from the fluoropolymer film 202; with a supportive scrim 206 and a second felt batt 210 positioned in a downstream direction 214. The catalytic composite 200 is capable to filtering particulates 220 which may be suspended in the incoming fluid flow 216 and also to reduce or remove chemical contaminants via catalyzed reaction at the porous catalytic fluoropolymer film 202 in the catalytic composite.

The fluoropolymer film 202 is formed of a perforated, catalytic fluoropolymer film similar to fluoropolymer film 102 as described above with reference to FIG. 1, and includes an intact portion 222 broken by perforations 224. The perforations 224 can be formed in the film 202 by way of a needling operation; or alternatively, by a needle punching operation, as described above with reference to perforations 118 (FIG. 1). Similar to the catalytic composite 100 (FIG. 1), the construction of the adjacent fluoropolymer film 202 and first felt batt 204 provide for circulation of the incoming fluid flow 216 within the internal structure 226 of the first felt batt, near the catalytic material of the fluoropolymer film 202, prior to the fluid passing through the fluoropolymer film 202 at the perforations 224 or via pores in the intact portion 222. In accordance with various embodiments, the fluoropolymer film 202 and first felt batt 204 can have similar thicknesses, permeability, and material properties as the fluoropolymer film 102 and felt batt 104 discussed above with reference to FIG. 1.

In one embodiment, a protective membrane 208 is positioned on an upstream side of the first felt batt 204, and is capable to capturing or preventing ingress of particulates 220. The protective membrane 208 can capture particulates (e.g., dust, soot, ash, or the like) to prevent entry of particles into the fluoropolymer film 102 or felt batt 104, prevent clogging of the perforations 118 of the film, and prevent fouling of the fluoropolymer film that might block access to the catalytic material therein. The protective membrane 208 can collect the particulates 220 in a film or cake that can be readily cleaned from the protective membrane, thus providing for easy maintenance of the composite 200. The protective membrane 208 can be constructed from any suitable porous membrane material, such as but not limited to a porous woven or nonwoven membrane, a PTFE woven or nonwoven, an ePTFE membrane, a fluoropolymer membrane, or the like. The protective membrane 208 is porous or microporous, and can be connected with the first felt batt 204 by way of laminating, heat treating, discontinuous or continuous adhesives, or other suitable method. Suitable protective membranes are described, for example, in U.S. Pat. No. 5,843,390.

In accordance with one embodiment, the fluoropolymer film 202 is supported by a scrim 206 that provides structural support without significantly impacting the overall fluid permeability of the catalytic composite 200. The scrim 206 can be any suitable, porous backing material capable of supporting the catalytic composite 200. The scrim can be, for example, a fluoropolymer woven or nonwoven, a PTFE woven or nonwoven, or in one specific embodiment, a woven made from ePTFE fibers (e.g. 440 decitex RASTEX® fiber, available from W. L. Gore and Associates, Inc., Elkton, Md.). The scrim 206 is preferably disposed downstream 214 of the fluoropolymer film 202, e.g., downstream and adjacent the fluoropolymer film 202, or alternatively, downstream and separated from the fluoropolymer film by one or more additional layers. Scrim 206 may be connected to film 202 by a needling or needle punching operation. The scrim 206 may also, or alternatively, be connected with the fluoropolymer film 202 by way of a heat treatment, by one or more connectors that press the layers together, or by an adhesive, e.g., a thin adhesive layer (which may be continuous or discontinuous) between the scrim 206 and fluoropolymer film 202, or by any suitable combination of two or more of the above methods, including a needling or needle punching operation. Generally, the scrim 206 has higher air permeability than the fluoropolymer film 202.

In one embodiment, the catalytic composite 200 can further include a second felt batt 210 positioned in the downstream direction 214 from the fluoropolymer film 202. The second felt batt 210 can have a similar construction and dimensions as the first felt batt 204, e.g., the second felt batt can be composed of any suitable woven or nonwoven, such as but not limited to a staple fiber woven or nonwoven, a PTFE staple fiber woven or nonwoven, or a fluoropolymer staple fiber woven or nonwoven. For example, the second felt batt 210 can be a PTFE fiber felt or a PTFE fiber fleece.

The fluoropolymer film 202, scrim 206, and the first and second felt batts 204, 210 may be connected together via a needling or needle punching operation, other methods as described with respect to the fluoropolymer film 102 and felt batt 104 of FIG. 1, or a combination of the above techniques. In one embodiment, the fluoropolymer film 202 alone is perforated, because the perforations provide for suitable fluid flow across the fluoropolymer film 202, whereas the other layers are generally more permeable to airflow than the fluoropolymer film 202. Alternatively, a sub-combination of the above elements may be perforated by the process of connecting the layers together using needling or needle punching, e.g., the fluoropolymer film 202 and scrim 206, the fluoropolymer film 202 and first felt batt 204, or the fluoropolymer film 202, first felt batt 204 and scrim 206. Some or all of the layers may be further connected via heat treatment, adhesive, or another suitable connection method. For example, the protective membrane 208 may be attached with the remaining layers by adhesion, heat treatment, or another method that does not result in perforations of the protective membrane. Alternatively, the protective membrane 208 can also be connected with the remaining layers via needling or needle punching.

The catalytic composites 100, 200 described above with reference to FIGS. 1 and 2 are illustrative embodiments of catalytic composites utilizing a perforated catalytic fluoropolymer film adjacent and downstream of a felt batt, the combination of which is able to direct a contaminated fluid flow along and through the catalytic fluoropolymer film to mitigate contamination in the fluid. The various additional components, e.g. the protective membrane 208, scrim 206, and second felt batt 210 described above with reference to FIG. 2 enhance the strength of the catalytic composite 200, and may provide additional advantages, such as improving the filter properties or reducing penetration of particulates.

Other combinations of the layered elements described above with respect to FIG. 2 are possible within the scope of this disclosure without deviating substantially therefrom, as well as additions of further filtering or catalytic elements therein. For example, one or more of the protective membrane 208, first and second felt batts 204, 210, and scrim 206 may possess catalytic properties. In addition, layers may be added or removed between the layers described above with respect to FIG. 2, e.g., additional catalytic fluoropolymer films, additional felt batt layers, additional catalytic materials such as catalytic felts (e.g., such as those described in U.S. Pat. No. 5,843,390), additional supportive layers or scrims, or fewer layers than those described above.

Additional catalytic fluoropolymer film or films similar to the porous catalytic fluoropolymer film 202 can be provided; either upstream or downstream of the fluoropolymer film 202, which contain a different catalyst or group of catalysts in order to provide the composite 200 with the ability to catalyze the remediation of multiple specific contaminants in the fluid flow. In one embodiment having an additional catalytic fluoropolymer film or films, further intermediate felt batts and/or scrims may be provided upstream and downstream, respectively, of each catalytic fluoropolymer film to separate the catalytic fluoropolymer films and provide room for circulation between the films.

Figure 3:
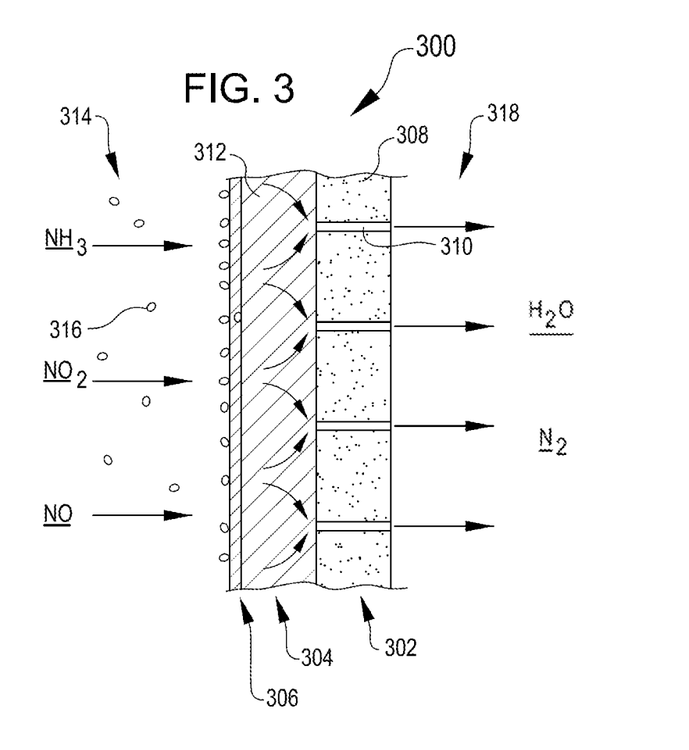
FIG. 3 is a schematic illustration of a third composite filter material that includes a perforated, porous catalytic fluoropolymer film assembled with an upstream felt batt and a protective porous membrane.

FIG. 3 illustrates an alternative catalytic composite 300 which includes only a catalytic fluoropolymer film 302, felt batt 304 positioned upstream of the fluoropolymer film, and protective membrane 306 positioned upstream of the felt batt. Here, the combination of the protective membrane 306, felt batt 304, and fluoropolymer film 302 operate in much the same manner as the membrane 208, first felt batt 204 and fluoropolymer film 202 described above with reference to FIG. 2. The incoming flow of air 314 passes through the protective membrane 306, which at least partly blocks ingress of particulates 316. The incoming flow of air 314 then passes through the felt batt 304, i.e. within the internal structure 312 of the felt batt, where it can interact with and begin to pass through the catalytic fluoropolymer film 302.

The fluoropolymer film 302 is perforated, as described above with respect to fluoropolymer film 102 (FIG. 1), such that one portion of the incoming flow of air 314 passes through the intact portion 308 of the fluoropolymer film and another, generally larger portion through the perforations 310. The perforations 318 can be formed, as described above, via a needling or needle punching operation. Two of the layers, or in some cases all three of the fluoropolymer film 302, felt batt 304, and protective membrane 306, may be needled or needle punched together in a single operation that both forms the perforations 310 and connects the layers. An additional connection step, e.g. a heat treatment or adhesive step, may be used for attaching the layers together.

Figure 4:
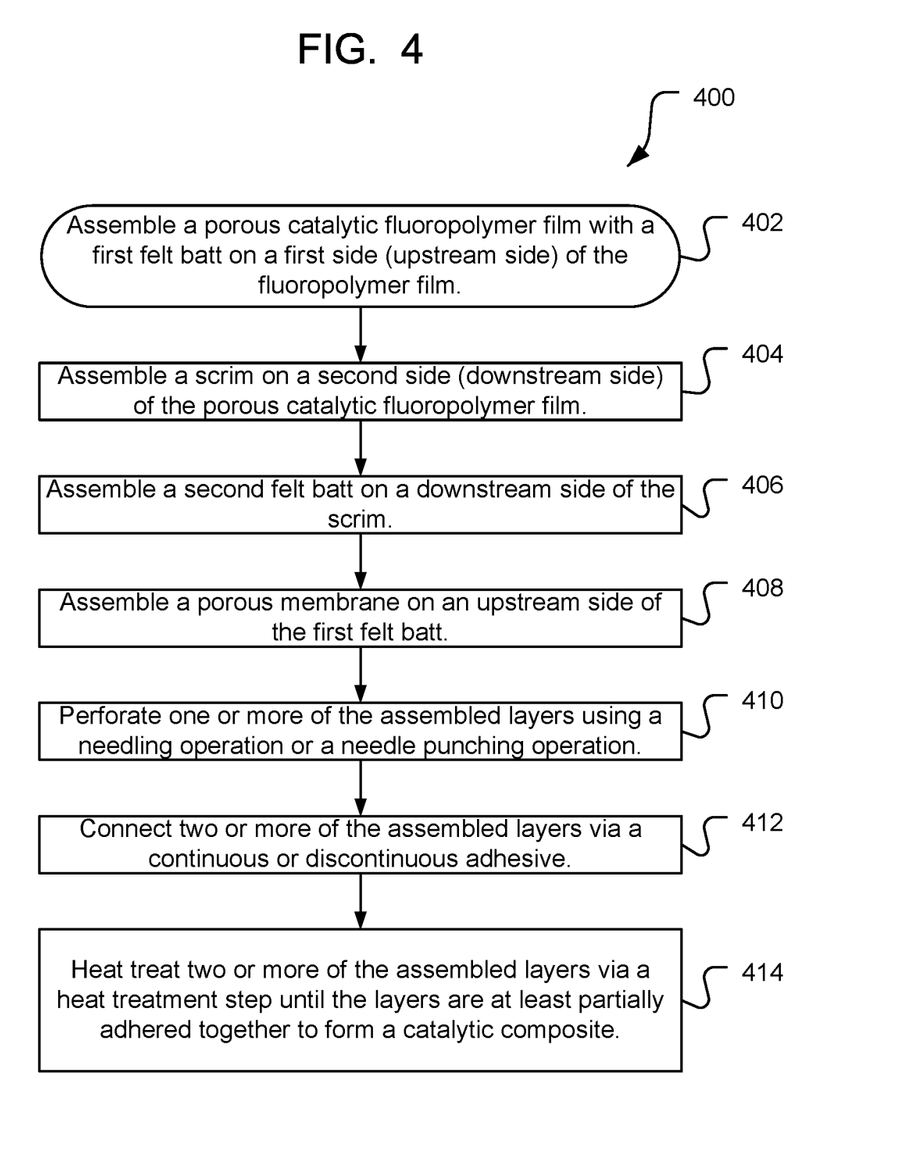
FIG. 4 illustrates an example process for assembling a composite filter material.
Figure 5:
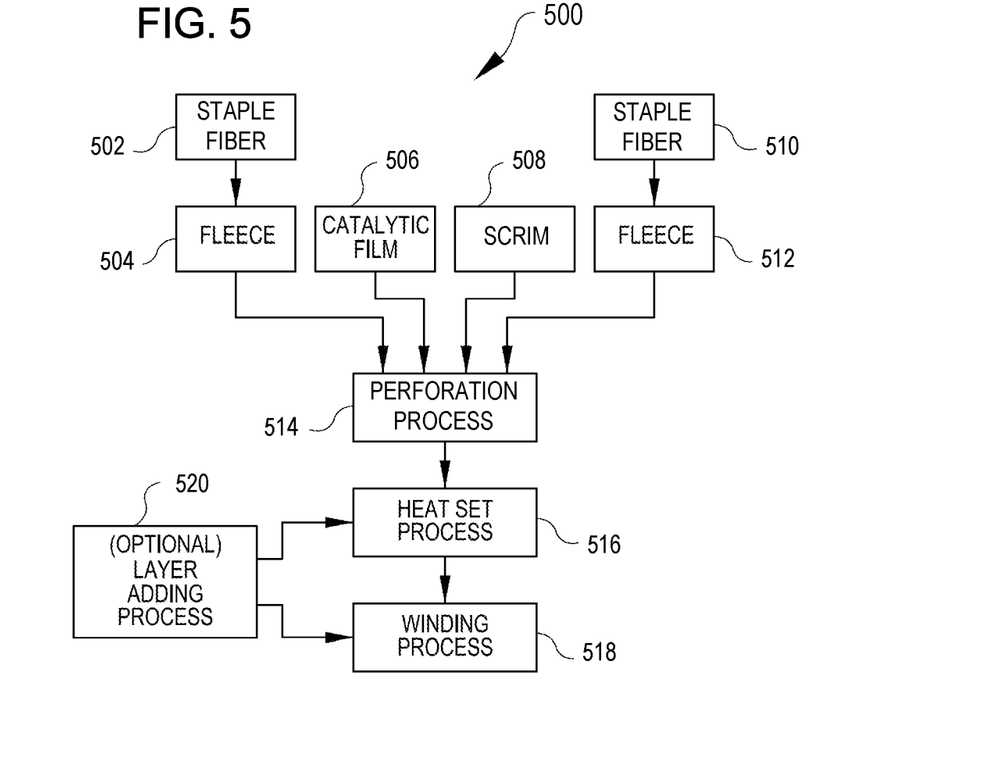
FIG. 5 illustrates specific aspects of a process for assembling a composite filter material as described in FIG. 4.

FIG. 4 describes an exemplary process 400 for the assembly of a catalytic composite, and FIG. 5 describes a specific embodiment of a catalytic composite assembly process 500.

For example, as illustrated in FIG. 4, a catalytic composite (such as catalytic composites 100, 200, 300, FIGS. 1-3) can be assembled by layering together a catalytic fluoropolymer film with a felt batt, such as a PTFE staple fiber fleece or similar layer to form a layered assembly (act 402). This first felt batt is layered on a first, upstream side of the catalytic fluoropolymer film. Additional layers may be assembled with the first felt batt and the fluoropolymer film, such as a scrim positioned adjacent a downstream side of the catalytic fluoropolymer film opposite the first felt batt (act 404), and a second felt batt adjacent a downstream side of the scrim (act 406). A protective, porous membrane layer may be added to the assembly adjacent an upstream side of the first felt batt (act 408). The assembled layers, or a subset of the assembled layers, may be subjected to a perforating step including needling, needle punching, or both operations (act 410). Where only a subset of the assembled layers are perforated, the needling or needle punching step (act 410) may be performed prior to one or more of the above-described layering steps, e.g., to the fluoropolymer film prior to assembly with a first felt batt, to the combined fluoropolymer film and first felt batt prior to layering with the scrim, to the combined fluoropolymer film, scrim, and first felt batt prior to addition of further layers, etc. The needling or needle punching step can effect a weak adhesion between the layers, which may be suitable alone to connect the layers, or which may be supplemented with the use of adhesives, connectors, or heat treatment to bond the layers to form the catalytic composite. For example, the assembled layers or a subset of the assembled layers may be further connected together by way of an adhesive (act 412), which can include a continuous or discontinuous adhesive bonding two or more of the layers. The assembled layers, or a subset of the assembled layers, may be connected together by way of a heat treatment (act 414) that at least partially adheres the layers together. Note that, as with the perforation step (act 410) the adhesion and/or heat treatment steps (acts 412, 414) may be performed at an intermediate stage of assembly, e.g., before the addition of the scrim (act 406), second felt batt (act 408) or porous protective membrane (act 408). For example, a layered assembly can be produced that includes the fluoropolymer film, scrim, and first and second felt batts prior to the needling or needle punching step, then layered with a non-perforated protective membrane layer, and then heat treated to form the catalytic composite. Alternatively, a layered assembly can be produced that includes all of the above layers, including a protective membrane layer, which is subsequently needled or needle punched and then set via heat treatment to form the catalytic composite; or the heat treatment step (act 414) may be omitted, or substituted with an adhesion step (act 412).

A simplified block diagram illustrating a specific exemplary assembly process 500 is shown in FIG. 5. According to one embodiment, a first carding operation can be conducted on a staple fiber 502 to produce a first felt batt or fleece 504; and a second carding operation can be conducted on another staple fiber 510 to produce a second felt batt or fleece 512. These felt batts 504, 512 can be layered on either side of a catalytic fluoropolymer film 506 and scrim 508 to produce a layered assembly which is subjected to a perforating step, e.g., a needling process or a needle punching process 514. This step results in a catalytic assembly that is connected together and in which the catalytic fluoropolymer film 506 is perforated.

The layers can be further connected using a heat set process 516 in which the layers are set by heating the assembly above 290° C. for a period of 1 to 2 minutes. The heat setting temperature can vary from 290° C. to 330° C.; and the heat setting period can vary from 1 to 2 minutes. The heat set catalytic composite can then be wound 518, or subjected to other manufacturing steps. A layer adding process 520 may be included to add layers to the catalytic composite, e.g., a protective membrane (such as protective membrane 208 (FIG. 2) or 306 (FIG. 3). The additional layer or membrane may be combined with the connected layers after the needle punching/needling process 514, so that the additional layer is not subjected to needling but still attached with the assembly via the heat setting process 516. The additional layer or membrane may be adhered or otherwise attached with the catalytic composite after the heat set process 516 but before winding 518. Alternatively, the additional layer or membrane may be added to the assembled layers prior to the needling or needle punch process 514, and may therefore be perforated as well.

In alternative embodiments, the fluoropolymer film 102 as described above with reference to FIG. 1 (or film 202, FIG. 2, etc.) can be replaced with a suitable perforated porous membrane that is substantially filled or completely filled with a catalytic material, i.e. a perforated, catalytic porous membrane. Such membranes may be fluoropolymer membranes or films, or alternative materials, including porous non-fluoropolymer membranes; and may be imbibed, coated, enmeshed, filled, or otherwise combined with any suitable catalytic material (e.g., catalytic particles) as described above. Suitable membrane materials can include, but are not limited to: fluoropolymers including PTFE and ePTFE, aramid, polyester, and polyphenylene ester (PPE).

In some embodiments, the catalytic material may be imbibed into pores of the porous membrane prior to the introduction of perforations therein. In some alternative embodiments, the catalytic material may be introduced (e.g. imbibed) into perforations of the porous membrane, either in addition to or instead of imbibing a catalytic material into the pores of the membrane. In various embodiments, the catalytic material can extend into the pores of the porous membrane and/or into the perforations of the porous membrane.

In some embodiments, the porous membrane can have a fibrillated microstructure, i.e. a microstructure including fibrils. Suitable fibrillated microstructures are described in, e.g., U.S. Pat. No. 5,849,235, which is hereby incorporated by reference for all purposes. Where the porous membrane has a microstructure including fibrils, the catalytic material can be imbibed in the pores of the membrane, can be enmeshed within the fibrils of the microstructure, or both. In embodiments having enmeshed catalytic material, the catalytic material (which can be catalytic particles) is enmeshed within the fibril microstructure before perforating the membrane. This filled structure obviates the need for binders to hold the catalytic material in place, making the catalytic material accessible to contaminants via the pores of the porous membrane or via the perforations. Other suitable microstructures are described in, e.g.: U.S. Pat. Nos. 7,572,502, 7,118,801, 5,891,402, 4,096,227, 3,953,566, and US Patent App. Pub. No. 2015/0315352 A1.

The invention has now been described in detail for the purposes of clarity and understanding. However, those skilled in the art will appreciate that certain changes and modifications may be practiced within the scope of the appended claims.

In the preceding description, for the purposes of explanation, numerous details have been set forth in order to provide an understanding of various embodiments of the present disclosure. It will be apparent to one skilled in the art, however, that certain embodiments may be practiced without some of these details, or with additional details. Further, specific materials and material properties as described with reference to one embodiment (e.g., material densities, porosities, thicknesses, alternative materials, etc.) may be combined or used in place of materials described in other embodiments except where explicitly contraindicated.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present disclosure. Accordingly, the above description should not be taken as limiting the scope of the present disclosure or claims.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the present disclosure, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

In the following, further examples are described to facilitate understanding of the disclosure:

E1. A catalytic composite can include a catalytic layered assembly, including a porous catalytic fluoropolymer film having a first, upstream side and a second, downstream side; and one or more felt batts includes at least a first felt batt positioned adjacent the upstream side of the porous catalytic fluoropolymer film to form the catalytic composite; wherein the fluoropolymer film is perforated.

E2. The composite of the preceding example, wherein the one or more felt batts are formed of fleece formed from PTFE staple fiber.

E3. The composite of any of the preceding examples, wherein the layered assembly is connected together by a plurality of perforations formed by a needle punching process.

E4. The composite of any of the preceding claims, further including a scrim positioned on the downstream side of the porous catalytic fluoropolymer film.

E5. The composite of claim 4, wherein the one or more felt batts further includes a second felt batt positioned downstream of the porous catalytic fluoropolymer layer.

E6. The composite of claim 5, wherein the first felt batt is positioned directly adjacent the porous catalytic fluoropolymer film, and wherein the second felt batt is positioned directly adjacent a downstream side of the scrim.

E7. The composite of any of the preceding claims, further including a porous protective layer disposed on an upstream side of the first felt batt for blocking particulate ingress.

E8. The composite of claim 7, wherein the porous protective layer is a low-drag ePTFE membrane.

E9. The composite of claim 7, wherein the porous protective layer is a porous expanded polytetrafluoroethylene (ePTFE) layer.

E10. The composite of any of claims 7-9, wherein the porous protective layer has a porosity defined by air permeability in the range of 0.6 to 16.0 m/min at 124.5 Pa.

E11. The composite of any of the preceding examples, wherein the porous catalytic fluoropolymer film is perforated by punching at a diameter corresponding to a punch diameter of 0.3 to 6.5 mm.

E12. The composite of any of the preceding examples, wherein the porous catalytic fluoropolymer film is perforated by needling at a diameter corresponding to a needle diameter of 0.1 to 3.0 mm.

E13. The composite of any of the preceding examples, wherein the one or more felt batts comprise a fluoropolymer.

E14. The composite of any of the preceding examples, wherein the fluoropolymer film is an expanded fluoropolymer film.

E15. The composite of any of the preceding examples, wherein the fluoropolymer film is an expanded polytetrafluoroethylene (ePTFE) film.

E16. The composite of any of the preceding examples, wherein the porous catalytic fluoropolymer film is a first porous catalytic fluoropolymer film, and further includes a second porous catalytic fluoropolymer film layered downstream of the first porous, catalytic fluoropolymer film.

E17. The composite of any of the preceding examples, wherein the fluoropolymer film includes catalytic particle suspended in an ePTFE matrix.

E18. The composite of any of the preceding examples, wherein each of the one or more felt batts are formed of a fluoropolymer.

E19. The composite of any of the preceding examples, wherein each of the one or more felt batts are formed of a PTFE felt fleece formed of PTFE staple fibers.

E20. The composite of any of the preceding examples, wherein each of the one or more felt batts comprises fluoropolymer having a density from 200 Grams per Square Meter to 450 Grams per Square Meter.

E21. The composite of any of the preceding examples, wherein the fluoropolymer film is perforated in a perforation pattern having a percent open area of at least 0.2%.

E22. The composite of any of the preceding examples, wherein the composite has an air permeability corresponding to a flow rate of at least 0.6 m/min at 124.5 Pa.

E23. The composite of any of the preceding examples, wherein the composite has an air permeability corresponding to a flow rate in the range of 0.6 to 21.3 m/min at 124.5 Pa.

E24. The composite of any of the preceding examples, wherein the composite can withstand continuous exposure to temperatures of at least 150° C.

E25. The composite any of the preceding examples, wherein the porous membrane has a microstructure comprising fibrils.

E26. The composite of the preceding example, wherein the catalytic material is enmeshed with the fibrils of the microstructure.

E27. The composite any of the preceding examples, wherein the catalytic material extends into pores of the porous membrane.

E28. A filter including the composite of any of the preceding examples.

E29. A catalytic article, including a perforated porous polymeric membrane containing therein a catalytic material.

E30. The catalytic article of the preceding example, wherein the perforated porous membrane has a microstructure comprising fibrils.

E31. The catalytic article of the preceding example, wherein the catalytic material is enmeshed with the fibrils of the microstructure.

E32. The catalytic article of any of the preceding examples, wherein the catalytic material extends into pores of the porous membrane.

E33. The catalytic article of any of the preceding examples, wherein the catalytic material is imbibed in pores of the porous membrane.

E34. The catalytic article of any of the preceding examples, wherein the catalytic material is imbibed in perforations of the porous membrane.

E35. A method of forming a catalytic composite that includes forming a catalytic layered assembly by layering a porous catalytic fluoropolymer film with a first felt batt on a first side of the porous catalytic fluoropolymer film; connecting the porous catalytic fluoropolymer film with the first felt batt to form a multilayered composite; and perforating the fluoropolymer film, such that the multilayered composite has a minimum air permeability of at least 0.9 m/min at 124.5 Pa.

E36. The method of any of the preceding examples, further including adding a scrim to the catalytic layered assembly on a second side of the porous catalytic fluoropolymer film opposite the first side.

E37. The method of any of the preceding examples, further including adding a second felt batt to the layered assembly adjacent the scrim and opposite the porous catalytic fluoropolymer film.

E38. The method of any of the preceding examples, further including adding a porous protective membrane to the layered assembly adjacent the first felt batt and opposite the porous catalytic fluoropolymer film.

E39. The method of any of the preceding examples, further including connecting the catalytic layered assembly together via an adhesive.

E40. The method of any of the preceding examples, further including heat treating the multilayered composite at a temperature in the range of 290° C. to 330° C. for at least 1 minute.

E41. The method of any of the preceding examples, further including heat setting the multilayered composite by heat treating the multilayered composite until the measured unconstraint shrinkage after being held at 260 C for 2 hours is less than 2% in both the transverse and machine direction.

E42. The method of any of the preceding examples, wherein perforating the fluoropolymer film further includes needle punching a perforation pattern into the fluoropolymer film to an open area of at least 0.2%.

E43. The method of any of the preceding examples, wherein perforating the fluoropolymer film further comprises needle punching a perforation pattern into the multilayered composite to an open area of at least 0.2%.

E44. The method of any of the preceding examples, wherein perforating the fluoropolymer film further includes needling a perforation pattern into the fluoropolymer film to an open area of at least 0.2%.

E45. The method of any of any of the preceding examples, wherein perforating the fluoropolymer film further includes needling a perforation pattern into the multilayered composite to an open area of at least 0.2%.

E46. A method of filtering a fluid, the method including providing a catalytic filter that includes a catalytic layered assembly with a porous catalytic fluoropolymer film and at least one felt batts positioned adjacent the fluoropolymer film, wherein the fluoropolymer film is perforated; placing the filter in a fluid stream and oriented with the scrim upstream of the fluoropolymer film with respect to a flow direction of the fluid stream; and passing the fluid stream through the catalytic filter.

What is claimed is:

1. A catalytic article, comprising: a perforated porous polymeric membrane containing therein a catalytic material, and wherein the perforated porous polymeric membrane comprises a plurality of perforations, and wherein each of the plurality of perforations is a straight passageway from an entrance surface at an upstream side of the perforated porous polymeric membrane to an exit surface at a downstream side of the perforated porous polymeric membrane.

2. The catalytic article of claim 1, wherein the perforated porous membrane has a microstructure comprising fibrils.

3. The catalytic article of claim 2, wherein the catalytic material is enmeshed with the fibrils of the microstructure.

4. The catalytic article of claim 3, wherein the catalytic material extends into pores of the perforated porous polymeric membrane.

5. The catalytic article of claim 2, wherein the catalytic material extends into pores of the perforated porous polymeric membrane.

6. The catalytic article of claim 1, wherein the catalytic material extends into pores of the perforated porous polymeric membrane.

7. The catalytic article of claim 1, wherein the straight passageway is configured to enhance flow therethrough as compared to flow via pores of the perforated porous polymeric membrane, and wherein the straight passageway has a diameter of 0.1 mm to 3 mm.

8. The catalytic article of claim 1, wherein a percent open area of the perforated porous polymeric membrane is from 0.14% to 50%.

9. The catalytic article of claim 1, wherein the perforated porous polymeric membrane has a perforation density on the order of from 185 to 558 holes per cm2, or from 1 to 64 holes per cm2.

10. The catalytic article of claim 1, wherein the perforated porous polymeric membrane has an air permeability of 1.5 to 61 m/min, under a pressure of 124.5 Pa.

11. The catalytic article of claim 1, wherein the catalytic material extends into perforations of the perforated porous polymeric membrane.

12. A method of forming a catalytic composite, comprising: forming a catalytic layered assembly by layering a porous catalytic fluoropolymer film with a first felt batt on a first side of the porous catalytic fluoropolymer film; connecting the porous catalytic fluoropolymer film with the first felt batt to form a multilayered composite; and perforating the fluoropolymer film, such that the multilayered composite has a minimum air permeability of at least 0.6 m/min at 124.5 Pa, and resulting in a plurality of perforations, and wherein each of the plurality of perforations is a straight passageway from an entrance surface at an upstream side of the perforated fluoropolymer film to an exit surface at a downstream side of the perforated fluoropolymer film.

13. The method of claim 12, further comprising:
adding a porous protective membrane to the layered assembly adjacent the first felt batt and opposite the porous catalytic fluoropolymer film.

14. The method of claim 13, wherein perforating the fluoropolymer film further comprises needling or needle punching a perforation pattern into the fluoropolymer film and/or into the fluoropolymer composite to an open area of at least 0.2%.

15. The method of claim 12, wherein perforating the fluoropolymer film further comprises needling or needle punching a perforation pattern into the fluoropolymer film and/or into the fluoropolymer composite to an open area of at least 0.2%.

16. A method of filtering a fluid, the method comprising: providing a catalytic filter comprising: a catalytic layered assembly comprising a porous catalytic fluoropolymer film; and at least one felt batts positioned adjacent the fluoropolymer film, wherein the fluoropolymer film is perforated comprising a plurality of perforations, and wherein each of the plurality of perforations is a straight passageway from an entrance surface at an upstream side of the perforated fluoropolymer film to an exit surface at a downstream side of the perforated fluoropolymer film; placing the filter in a fluid stream and oriented with the scrim upstream of the fluoropolymer film with respect to a flow direction of the fluid stream; and passing the fluid stream through the catalytic filter.

* * * * *